United States Patent
Tomita et al.

(10) Patent No.: US 10,656,546 B1
(45) Date of Patent: May 19, 2020

(54) ELECTROSTATIC-IMAGE DEVELOPING TONER, ELECTROSTATIC-IMAGE DEVELOPER, AND TONER CARTRIDGE

(71) Applicant: FUJI XEROX CO., LTD., Tokyo (JP)

(72) Inventors: Daisuke Tomita, Kanagawa (JP); Yasuo Kadokura, Kanagawa (JP); Atsushi Sugawara, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/519,298

(22) Filed: Jul. 23, 2019

(30) Foreign Application Priority Data

Mar. 13, 2019 (JP) ................................. 2019-045895

(51) Int. Cl.
| | |
|---|---|
| *G03G 9/08* | (2006.01) |
| *G03G 9/097* | (2006.01) |
| *G03G 9/087* | (2006.01) |
| *G03G 9/09* | (2006.01) |
| *G03G 15/08* | (2006.01) |
| *G03G 9/093* | (2006.01) |
| *C08F 293/00* | (2006.01) |

(52) U.S. Cl.
CPC ...... *G03G 9/09775* (2013.01); *C08F 293/005* (2013.01); *G03G 9/08711* (2013.01); *G03G 9/08755* (2013.01); *G03G 9/08788* (2013.01); *G03G 9/091* (2013.01); *G03G 9/093* (2013.01); *G03G 9/09733* (2013.01); *G03G 15/0865* (2013.01)

(58) Field of Classification Search
CPC ........... G03G 9/08755; G03G 9/08711; G03G 9/09733
USPC ............................... 430/108.2, 109.3, 109.4
See application file for complete search history.

(56) References Cited

FOREIGN PATENT DOCUMENTS

JP 2016-051048 A 4/2016

OTHER PUBLICATIONS

"Testing Methods for Transition Temperatures of Plastics", Japanese Industrial Standard JIS K 7121, 1987, 26 pages.

*Primary Examiner* — Mark A Chapman
(74) *Attorney, Agent, or Firm* — Sughrue Mion, PLLC

(57) ABSTRACT

An electrostatic-image developing toner includes toner particles including a binder resin including an amorphous resin including a polyester resin segment and a styrene acrylate resin segment and a release agent. The content of 1-amino-2-methoxybenzene in the electrostatic-image developing toner is 200 ppm by mass or less.

11 Claims, 2 Drawing Sheets

ELECTROSTATIC-IMAGE DEVELOPING TONER, ELECTROSTATIC-IMAGE DEVELOPER, AND TONER CARTRIDGE

CROSS-REFERENCE TO RELATED APPLICATIONS

This application is based on and claims priority under 35 USC 119 from Japanese Patent Application No. 2019-045895 filed Mar. 13, 2019.

BACKGROUND

(i) Technical Field

The present disclosure relates to a toner for developing electrostatic images (hereinafter, referred to as "electrostatic-image developing toner"), an electrostatic-image developer, and a toner cartridge.

(ii) Related Art

Japanese Laid Open Patent Application Publication No. 2016-51048 discloses an electrostatic-image developing toner that includes a binder resin and at least one type of particles selected from the group consisting of vinyl resin particles and urethane resin particles. The binder resin includes an amorphous composite polyester resin constituted by a vinyl resin unit and a polyester resin unit that are chemically bonded to each other and a crystalline polyester resin. The mass ratio of the crystalline polyester resin to the amorphous composite polyester resin is 14/86 or more and 30/70 or less.

SUMMARY

Aspects of non-limiting embodiments of the present disclosure relate to an electrostatic-image developing toner that enables the formation of images having higher scratch resistance than an electrostatic-image developing toner that includes toner particles including an amorphous resin including a polyester resin segment and a styrene acrylate resin segment and a release agent in which the content of 1-amino-2-methoxybenzene is more than 200 ppm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic-image developing toner including toner particles including a binder resin including an amorphous resin, the amorphous resin including a polyester resin segment and a styrene acrylate resin segment, and a release agent. The electrostatic-image developing toner further includes 1-amino-2-methoxybenzene. The content of the 1-amino-2-methoxybenzene in the electrostatic-image developing toner is 200 ppm by mass or less.

BRIEF DESCRIPTION OF THE DRAWINGS

Exemplary embodiments of the present disclosure will be described in detail based on the following figures, wherein.

DETAILED DESCRIPTION

Figure 1:
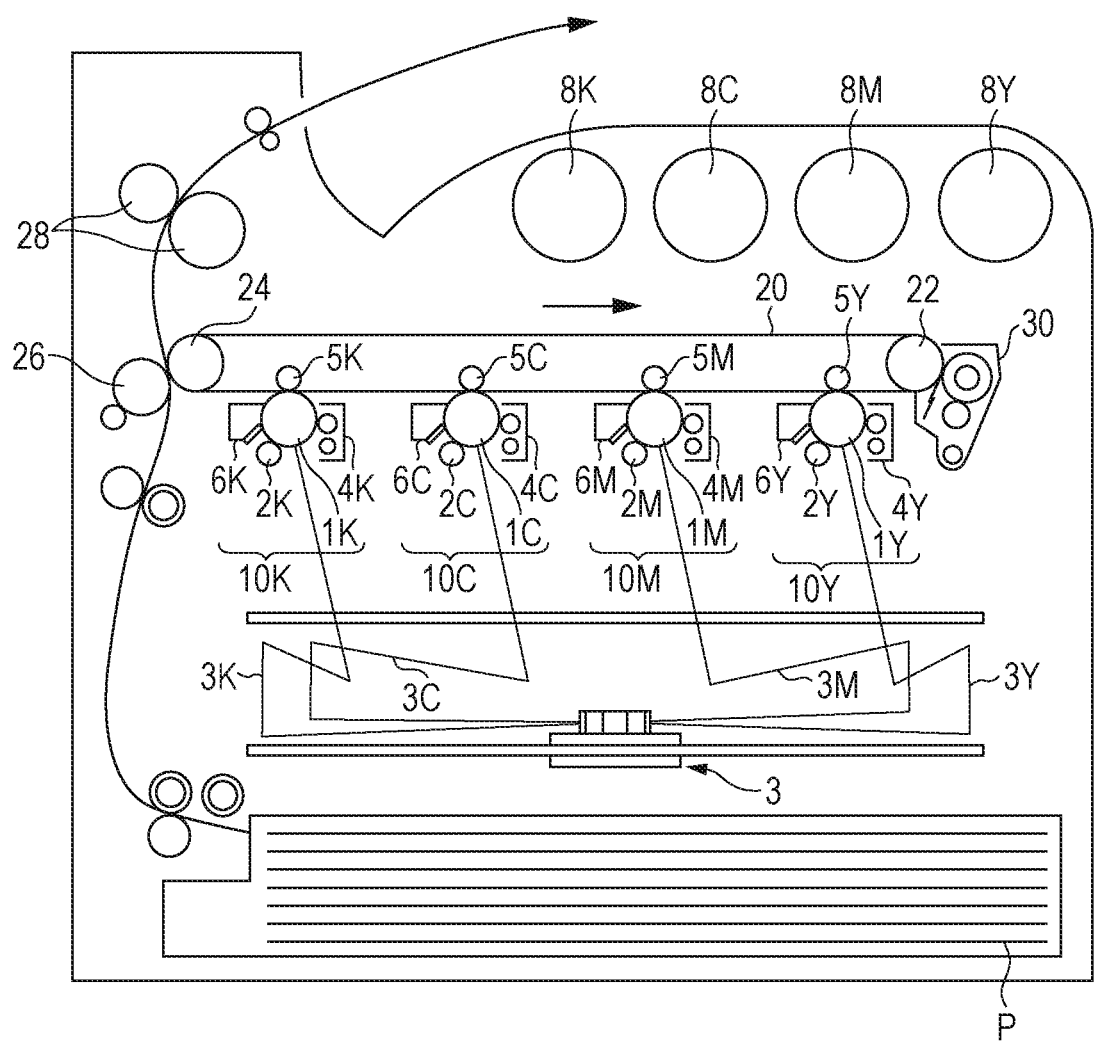
FIG. 1 is a schematic diagram illustrating an example of an image forming apparatus according to an exemplary embodiment.

Exemplary embodiments of the present disclosure are described below. The following description and Examples below are intended to be illustrative of the exemplary embodiments and not restrictive of the scope of the exemplary embodiments.

In the present disclosure, a numerical range expressed using "to" means the range specified by the minimum and maximum described before and after "to", respectively.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

The term "step" used herein refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the present disclosure may include plural types of substances that correspond to the component. In the present disclosure, in the case where a composition includes plural substances that correspond to a component of the composition, the content of the component in the composition is the total content of the plural substances in the composition unless otherwise specified.

In the present disclosure, the number of types of particles that correspond to a component may be two or more. In the case where a composition includes plural types of particles that correspond to a component of the composition, the particle size of the component is the particle size of a mixture of the plural types of particles included in the composition unless otherwise specified.

The term "(meth)acryl" used herein refers to both "acryl" and "methacryl".

In the present disclosure, an electrostatic-image developing toner is referred to simply as "toner", and an electrostatic-image developer is referred to simply as "developer".

Electrostatic-Image Developing Toner

The toner according to the exemplary embodiment includes toner particles including a binder resin and a release agent, the binder resin including an amorphous resin including a polyester resin segment and a styrene acrylate resin segment. The toner further includes 1-amino-2-methoxybenzene. The content of the 1-amino-2-methoxybenzene in the toner is 200 ppm by mass or less.

In the present disclosure, the "amorphous resin including a polyester resin segment and a styrene acrylate resin segment" is referred to as "hybrid amorphous resin". The polyester resin segment and the styrene acrylate resin segment included in the hybrid amorphous resin are chemically bonded to each other.

The term "crystalline" resin used herein refers to a resin that, in thermal analysis using differential scanning calorimetry (DSC), exhibits a distinct endothermic peak instead of step-like endothermic change and specifically refers to a resin that exhibits an endothermic peak with a half-width of 10° C. or less at a heating rate of 10° C./min. On the other hand, the term "amorphous" resin used herein refers to a resin that exhibits an endothermic peak with a half-width of more than 10° C., that exhibits step-like endothermic change, or that does not exhibit a distinct endothermic peak.

Images formed using the toner according to the exemplary embodiment may have higher scratch resistance than images formed using a toner that includes toner particles including the hybrid amorphous resin, a release agent, and 1-amino-2-methoxybenzene, the content of the 1-amino-2-methoxybenzene in the toner being more than 200 ppm by mass. The mechanisms are presumably as follows.

Since the hybrid amorphous resin and a release agent are compatible with each other, a release agent is likely to be dispersed in the form of microparticles on toner particles that include the hybrid amorphous resin as a binder resin. Toner particles including release agent particles dispersed thereon in the form of microparticles enhance the fixability of images to a recording medium and the fastness of the images. Consequently, images formed using toner particles that include the hybrid amorphous resin are resistant to abrasion and scratch.

However, when two or more of the conditions under which images are likely to detach from a recording medium (e.g., when the recording medium is a resin sheet, when the image formed is a halftone image, and when the image formed is stored for a prolonged period of time) are met, image defects may occur when images are scratched even in the case where the images are formed using the toner particles including the hybrid amorphous resin.

As a result of the studies conducted by the inventors of the present disclosure, it was found that the scratch resistance may be enhanced when the content of 1-amino-2-methoxybenzene is reduced to 200 ppm or less.

It is considered that 1-amino-2-methoxybenzene, the molecule of which has a polarity, inhibits the dispersion of the releasing agent in the hybrid amorphous resin. Therefore, it is considered that reducing the content of 1-amino-2-methoxybenzene increases the dispersion of the release agent and consequently enhances the fixability and fastness of images.

The content of 1-amino-2-methoxybenzene in the toner may be minimized in order to form images having high scratch resistance. The content of 1-amino-2-methoxybenzene in the toner according to the exemplary embodiment is, by mass, 200 ppm or less, is preferably 160 ppm or less, is more preferably 100 ppm or less, is further preferably 60 ppm or less, and is most preferably below the detection limit (i.e., substantially 0 ppm).

As a result of the studies conducted by the inventors of the present disclosure, it was also found that images formed using a toner that includes a crystalline resin as a binder resin have higher scratch resistance than images formed using a toner that does not include a crystalline resin as a binder resin. It is considered that a release agent is likely to be dispersed in the form of microparticles on toner particles that include a crystalline resin because a crystalline resin has a molecular structure relatively analogous to that of a release agent compared with an amorphous resin and is compatible with a release agent. Toner particles including release agent particles dispersed thereon in the form of microparticles enhance the fixability of images to a recording medium and the fastness of the images. Consequently, images formed using a toner that includes a crystalline resin as a binder resin may be resistant to scratch.

The content of 1-amino-2-methoxybenzene in the toner is measured using a gas chromatography analyzer "GC-2010" produced by Shimadzu Corporation and a column "Rtx-1, P/N: 10157" produced by Restek. The specific measuring method is as follows.

The toner (100 mg) is weighed in a vial for HS-GCMS analysis. The vial is hermetically sealed and used as a sample for measurement. The column temperature is maintained at 40° C. for 5 minutes and subsequently increased to 250° C. at a rate of 15° C./min. The amount of 1-amino-2-methoxybenzene is determined on the basis of the area of the peak corresponding to 1-amino-2-methoxybenzene and a calibration curve. The ratio (ppm) of the amount of 1-amino-2-methoxybenzene to the total amount of the toner is calculated.

Details of the toner according to the exemplary embodiment are described below.

Toner Particles

The toner particles include the hybrid amorphous resin and a release agent. The toner particles may further include other resins, a colorant, and other additives.

Binder Resin

The toner particles according to the exemplary embodiment include, as a binder resin, at least one hybrid amorphous resin.

Hybrid Amorphous Resin

The hybrid amorphous resin included in the toner particles according to the exemplary embodiment is not limited and may be any amorphous resin the molecule of which includes a polyester resin segment and a styrene acrylate resin segment.

The hybrid amorphous resin may be any of the following resins:

a resin that includes a backbone consisting of a polyester resin and a side chain consisting of a styrene acrylate resin which is chemically bonded to the backbone;

a resin that includes a backbone consisting of a styrene acrylate resin and a side chain consisting of a polyester resin which is chemically bonded to the backbone;

a resin that includes a backbone consisting of a polyester resin and a styrene acrylate resin that are chemically bonded to each other; and a resin that includes a backbone consisting of a polyester resin and a styrene acrylate resin that are chemically bonded to each other and at least one selected from a side chain consisting of a polyester resin which is chemically bonded to the backbone and a side chain consisting of a styrene acrylate resin which is chemically bonded to the backbone.

Polyester Resin Segment

In the exemplary embodiment, the term "polyester resin" refers to a high-molecular compound the backbone of which includes an ester linkage (—COO—).

An example of the polyester resin segment included in the hybrid amorphous resin according to the exemplary embodiment is a polymer produced by condensation between a polyhydric alcohol and a polyvalent carboxylic acid.

Examples of the polyhydric alcohol include aliphatic diols, such as ethylene glycol, 1,2-propanediol, 1,3-propanediol, 1,2-butanediol, 1,3-butanediol, 1,4-butanediol, 2,3-butanediol, neopentyl glycol, 1,4-butenediol, 1,5-pentanediol, 1,6-hexanediol, 1,8-octanediol, 1,9-nonanediol, 1,10-decanediol, and 1,12-dodecanediol; alicyclic diols, such as cyclohexanediol, cyclohexanedimethanol, and hydrogenated bisphenol A; and aromatic diols, such as bisphenol A, bisphenol A-ethylene oxide adduct, and bisphenol A-propylene oxide adduct.

Trihydric or higher alcohols having a crosslinked structure or a branched structure may be used as a polyhydric alcohol in combination with the diols. Examples of the trihydric or higher alcohols include glycerin, trimethylolpropane, pentaerythritol, and sorbitol.

The above polyhydric alcohols may be used alone or in combination of two or more.

The polyhydric alcohol is preferably an aromatic diol, is more preferably at least one selected from the group consisting of bisphenol A-ethylene oxide adduct and bisphenol A-propylene oxide adduct, and is further preferably bisphenol A-propylene oxide adduct. The average number of moles of adduct in the bisphenol A-ethylene oxide adduct or the bisphenol A-propylene oxide adduct is preferably 1 or more and 16 or less, is more preferably 1.2 or more and 12 or less, is further preferably 1.5 or more and 8 or less, and is particularly preferably 2 or more and 4 or less.

In the exemplary embodiment, the ratio of the total amount of bisphenol A-ethylene oxide adduct and bisphenol A-propylene oxide adduct to the total amount of all the alcohol components that constitute the polyester resin segment is preferably 10 mol % or more and 90 mol % or less, is more preferably 20 mol % or more and 80 mol % or less, and is further preferably 30 mol % or more and 70 mol % or less.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenylsuccinic acid (e.g., dodecenylsuccinic acid or octenylsuccinic acid), adipic acid, sebacic acid, 1,12-dodecanedioic acid, and azelaic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of the above carboxylic acids; and lower alkyl esters of the above carboxylic acids which include 1 to 5 carbon atoms and preferably include 1 to 3 carbon atoms.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower alkyl esters of these carboxylic acids which include 1 to 5 carbon atoms and preferably include 1 to 3 carbon atoms.

The above polyvalent carboxylic acids may be used alone or in combination of two or more.

The carboxylic acid component of the polyester resin segment may include at least one non-aromatic dicarboxylic acid including an unsaturated carbon-carbon bond. This dicarboxylic acid forms a part of the polyester resin segment as a result of condensation polymerization with the polyhydric alcohol, and the styrene acrylate resin segment chemically bonds to the polyester resin segment as a result of addition polymerization of a styrene or a (meth)acrylic acid ester to the unsaturated carbon-carbon bond derived from the dicarboxylic acid.

Examples of the non-aromatic dicarboxylic acid that includes an unsaturated carbon-carbon bond include fumaric acid, maleic acid, 1,2,3,6-tetrahydrophthalic acid, alkenylsuccinic acid, such as dodecenylsuccinic acid or octenyl-succinic acid, and anhydrides of the above dicarboxylic acids. Among these, fumaric acid is preferable in terms of reactivity.

Styrene Acrylate Resin Segment

An example of the styrene acrylate resin segment included in the hybrid amorphous resin according to the exemplary embodiment is a segment produced by addition polymerization of an addition polymerizable monomer. Examples of the addition polymerizable monomer that constitutes the styrene acrylate resin segment include a styrene, a (meth)acrylic acid ester, and a monomer including an ethylenically unsaturated double bond, which are commonly used for synthesis of styrene acrylate resins.

Examples of the styrene that constitutes the styrene acrylate resin segment include substituted and unsubstituted styrenes. Examples of the substituent group included in the styrenes include an alkyl group having 1 to 5 carbon atoms, a halogen atom, an alkoxy group having 1 to 5 carbon atoms, a sulfo group, and salts of the above groups. Specific examples of the styrene include styrene, methylstyrene, α-methylstyrene, β-methylstyrene, t-butylstyrene, chlorostyrene, chloromethylstyrene, methoxystyrene, styrenesulfonic acid, and salts of the above styrenes. Among these, styrene is preferable.

Examples of the (meth)acrylic acid ester that constitutes the styrene acrylate resin segment include a (meth)acrylic acid alkyl ester (e.g., the alkyl group has 1 to 24 carbon atoms), benzyl (meth)acrylate, and dimethylaminoethyl (meth)acrylate. Among these, a (meth)acrylic acid alkyl ester in which the alkyl group has 1 to 18 carbon atoms is preferable, a (meth)acrylic acid alkyl ester in which the alkyl group has 1 to 12 carbon atoms is more preferable, and a (meth)acrylic acid alkyl ester in which the alkyl group has 1 to 8 carbon atoms is further preferable. Specific examples of the (meth)acrylic acid alkyl ester include methyl (meth)acrylate, ethyl (meth)acrylate, (iso)propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, palmityl (meth)acrylate, stearyl (meth)acrylate, and behenyl (meth)acrylate.

The monomer that constitutes the styrene acrylate resin segment may include at least one non-aromatic monocarboxylic acid including an unsaturated carbon-carbon bond. This monocarboxylic acid forms a part of the styrene acrylate resin segment as a result of addition polymerization, and the styrene acrylate resin segment hybridizes with the polyester resin segment as a result of condensation polymerization of the carboxyl group derived from the monocarboxylic acid and the alcohol component of the polyester resin segment. The non-aromatic monocarboxylic acid including an unsaturated carbon-carbon bond is preferably one or more monocarboxylic acids selected from an acrylic acid and a methacrylic acid and is more preferably an acrylic acid.

Examples of other monomers that constitute the styrene acrylate resin segment include olefins, such as ethylene, propylene, and butadiene; halovinyls, such as vinyl chloride; vinyl esters, such as vinyl acetate and vinyl propionate; vinyl ethers, such as vinyl methyl ether; halogenated vinylidenes, such as vinylidene chloride; and N-vinyl compounds, such as N-vinyl pyrrolidone.

In the exemplary embodiment, the ratio of the total amount of the styrenes to the total amount of all the monomers that constitute the styrene acrylate resin segment is preferably 50% by mass or more and 90% by mass or less, is more preferably 60% by mass or more and 85% by mass or less, and is further preferably 70% by mass or more and 80% by mass or less.

In the exemplary embodiment, the ratio of the total amount of the (meth)acrylic acid esters to the total amount of all the monomers that constitute the styrene acrylate resin segment is preferably 10% by mass or more and 50% by mass or less, is more preferably 15% by mass or more and 40% by mass or less, and is further preferably 20% by mass or more and 30% by mass or less.

In the exemplary embodiment, the ratio of the total amount of the styrenes and the (meth)acrylic acid esters to the total amount of all the monomers that constitute the styrene acrylate resin segment is preferably 80% by mass or more, is more preferably 90% by mass or more, is further preferably 95% by mass or more, and is particularly preferably 100% by mass.

The ratio of the total amount of the polyester resin segment and the styrene acrylate resin segment to the amount of the entire hybrid amorphous resin is preferably 80% by mass or more, is more preferably 90% by mass or more, is further preferably 95% by mass or more, and is particularly preferably 100% by mass.

In the hybrid amorphous resin, the ratio of the amount of the styrene acrylate resin segment to the total amount of the polyester resin segment and the styrene acrylate resin segment is preferably 20% by mass or more and 60% by mass or less, is more preferably 25% by mass or more and 55% by mass or less, and is further preferably 30% by mass or more and 50% by mass or less in order to form images having high scratch resistance.

The weight-average molecular weight (Mw) of the hybrid amorphous resin is preferably 5,000 or more and 500,000 or less, is more preferably 10,000 or more and 100,000 or less, and is further preferably 15,000 or more and 50,000 or less.

In the present disclosure, the weight-average molecular weight and number-average molecular weight of a resin are measured by gel permeation chromatography (GPC). Specifically, the above molecular weights of a resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight-average molecular weight and number-average molecular weight of the resin are determined on the basis of the results of the measurement and a molecular-weight calibration curve prepared using monodisperse polystyrene standard samples.

The glass transition temperature (Tg) of the hybrid amorphous resin is preferably 25° C. or more and 80° C. or less, is more preferably 30° C. or more and 70° C. or less, and is further preferably 40° C. or more and 60° C. or less.

In the present disclosure, the glass transition temperature of a resin is determined on the basis of a curve obtained by differential scanning calorimetry (DSC), that is, a DSC curve. More specifically, the glass transition temperature of a resin is determined on the basis of the "extrapolated glass-transition-starting temperature" according to a method for determining glass transition temperature which is described in JIS K 7121:1987 "Testing Methods for Transition Temperatures of Plastics".

The acid value of the hybrid amorphous resin is preferably 5 mgKOH/g or more and 40 mgKOH/g or less, is more preferably 10 mgKOH/g or more and 35 mgKOH/g or less, and is further preferably 15 mgKOH/g or more and 30 mgKOH/g or less.

The hybrid amorphous resin may be produced by any of the methods (i) to (iii) below.

(i) The polyester resin segment is prepared by condensation polymerization of the polyhydric alcohol and the polyvalent carboxylic acid, and addition polymerization of monomers that constitute the styrene acrylate resin segment to the polyester resin segment is performed.

(ii) The styrene acrylate resin segment is prepared by addition polymerization of the addition polymerizable monomer, and condensation polymerization of the polyhydric alcohol and the polyvalent carboxylic acid is performed.

(iii) Condensation polymerization of the polyhydric alcohol and the polyvalent carboxylic acid and addition polymerization of the addition polymerizable monomers are performed simultaneously.

Other Amorphous Resins

In the exemplary embodiment, the toner particles may include amorphous resins other than the hybrid amorphous resin. Examples of the other amorphous resins include a polyester resin.

In the exemplary embodiment, the ratio of the amount of the hybrid amorphous resin to the total amount of the amorphous resins included in the toner particles as binder resins is 50% by mass or more and 100% by mass or less, is more preferably 90% by mass or more and 100% by mass or less, is further preferably 95% by mass or more and 100% by mass or less, and is particularly preferably 100% by mass.

Crystalline Resin

In the exemplary embodiment, the toner particles preferably include a crystalline resin and more preferably includes a crystalline polyester resin.

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers including an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The melting temperature of the crystalline polyester resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline polyester resin may have a weight-average molecular weight Mw of 6,000 or more and 35,000 or less.

In the case where the toner particles according to the exemplary embodiment include the crystalline resin, the amount of the crystalline resin is preferably 1% by mass or more and 40% by mass or less, is more preferably 2% by mass or more and 30% by mass or less, and is further preferably 3% by mass or more and 20% by mass or less of the total amount of all the binder resins used.

In the case where the toner particles according to the exemplary embodiment include the crystalline polyester resin, the amount of the crystalline polyester resin is preferably 1% by mass or more and 40% by mass or less, is more preferably 2% by mass or more and 30% by mass or less, and is further preferably 3% by mass or more and 20% by mass or less of the total amount of all the binder resins used.

The content of the binder resin in the toner particles is preferably 40% by mass or more and 95% by mass or less, is more preferably 50% by mass or more and 90% by mass or less, and is further preferably 60% by mass or more and 85% by mass or less.

Colorant

Examples of the colorant include pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. Plural types of colorants may be used in combination.

The content of the colorant in the toner particles is preferably 1% by mass or more and 30% by mass or less and is more preferably 3% by mass or more and 15% by mass or less.

Examples of a yellow colorant include C.I. Pigment Yellow 74. A part of the chemical structure of C.I. Pigment Yellow 74 is analogous to 1-amino-2-methoxybenzene. In the case where C.I. Pigment Yellow 74 is used as a colorant, the 1-amino-2-methoxybenzene included in the C.I. Pigment Yellow 74 may enter the toner. In the case where C.I. Pigment Yellow 74 is used, the concentration of 1-amino-2-methoxybenzene in the C.I. Pigment Yellow 74 may be reduced by purifying the C.I. Pigment Yellow 74 or washing the C.I. Pigment Yellow 74 with water before use.

In the exemplary embodiment, in the case where C.I. Pigment Yellow 74 is used, the amount of C.I. Pigment Yellow 74 is preferably 1% by mass or more and 30% by mass or less, is more preferably 2% by mass or more and 20% by mass or less, and is further preferably 3% by mass or more and 15% by mass or less of the amount of the entire toner particles.

In the exemplary embodiment, in the case where the toner particles are yellow toner particles, C.I. Pigment Yellow 74 may be used alone as a colorant. Alternatively, C.I. Pigment Yellow 74 may be used in combination with another colorant. The ratio of the amount of C.I. Pigment Yellow 74 to the total amount of the colorants is, for example, 50% by mass or more and 100% by mass or less, is preferably 80% by mass or more and 100% by mass or less, is more preferably 90% by mass or more and 100% by mass or less, and is further preferably 100% by mass.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The melting temperature of the release agent is preferably 50° C. or more and 110° C. or less and is more preferably 60° C. or more and 100° C. or less. The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The content of the release agent in the toner particles is preferably 1% by mass or more and 20% by mass or less and is more preferably 5% by mass or more and 15% by mass or less.

An example of the release agent is a paraffin wax. The melting temperature of the paraffin wax is preferably 70° C. or more and 100° C. or less and is more preferably 80° C. or more and 95° C. or less.

An example of the release agent is an ester wax. The melting temperature of the ester wax is preferably 70° C. or more and 100° C. or less and is more preferably 80° C. or more and 95° C. or less.

Other Additives

Examples of the other additives include additives known in the related art, such as a magnetic substance, a chargecontrolling agent, and an inorganic powder. These additives may be added to the toner particles as internal additives.

Properties, etc. of Toner Particles

The toner particles may have a single-layer structure or a "core-shell" structure constituted by a core (i.e., core particle) and a coating layer (i.e., shell layer) covering the core. The core-shell structure of the toner particles may be constituted by, for example, a core including a binder resin and, as needed, other additives such as a colorant and a release agent and by a coating layer including the binder resin.

The volume-average diameter D50v of the toner particles is preferably 2 μm or more and 10 μm or less and is more preferably 4 μm or more and 8 μm or less.

The above-described average diameters and particle diameter distribution indices of the toner particles are measured using "COULTER Multisizer II" (produced by Beckman Coulter, Inc.) with an electrolyte "ISOTON-II" (produced by Beckman Coulter, Inc.) in the following manner.

A sample to be measured (0.5 mg or more and 50 mg or less) is added to 2 ml of a 5 mass %-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER Multisizer II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume-average particle diameter D50v and the number-average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle diameter distribution index (GSDv) is calculated as $(D84v/D16v)^{1/2}$ and the number particle diameter distribution index (GSDp) is calculated as $(D84p/D16p)^{1/2}$.

The toner particles preferably have an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation.

The number of samples used for determining the average circularity of the toner particles is 3500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO.SiO_2$ particles, $K_2O.(TiO_2)_n$ particles, $Al_2O_3.2SiO_2$ particles, $CaCO_3$ particles, $MgCO_3$ particles, $BaSO_4$ particles, and $MgSO_4$ particles.

The surfaces of the inorganic particles used as the external additive may be subjected to a hydrophobic treatment. The hydrophobic treatment may be performed by, for example, immersing the inorganic particles in a hydrophobizing agent. Examples of the hydrophobizing agent include, but are not limited to, a silane coupling agent, silicone oil, a titanate coupling agent, and aluminium coupling agent. These hydrophobizing agents may be used alone or in combination of two or more. The amount of the hydrophobizing agent used is normally, for example, 1 part by mass or more and 10 parts by mass or less relative to 100 parts by mass of the inorganic particles.

Examples of other external additives include particles of a resin, such as polystyrene, polymethyl methacrylate, or a melamine resin; and particles of a cleaning lubricant, such as a metal salt of a higher fatty acid, such as zinc stearate, or a fluorine-based high-molecular-weight compound.

The amount of the external additive deposited on the toner particles is preferably 0.01% by mass or more and 5% by mass or less and is more preferably 0.01% by mass or more and 2.0% by mass or less of the amount of the toner particles.

Method for Producing Toner

The toner according to the exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

Specifically, in the case where, for example, aggregation coalescence is used in order to prepare the toner particles, the toner particles are prepared by the following steps:

preparing a resin particle dispersion liquid in which resin particles serving as a binder resin are dispersed (i.e., resin particle dispersion liquid preparation step);

causing the resin particles (and, as needed, other particles) to aggregate together in the resin particle dispersion liquid (or in the resin particle dispersion liquid mixed with another particle dispersion liquid as needed) in order to form aggregated particles (i.e., aggregated particle formation step);

and heating the resulting aggregated particle dispersion liquid in which the aggregated particles are dispersed in order to cause fusion and coalescence of the aggregated particles to occur and thereby form toner particles (fusion-coalescence step).

Each of the above steps is described below in detail. Hereinafter, a method for preparing toner particles including a colorant and a release agent is described. However, it should be noted that the colorant and the release agent are optional. It is needless to say that additives other than a colorant and a release agent may be used.

Resin Particle Dispersion Liquid Preparation Step

In addition to a resin particle dispersion liquid in which resin particles serving as a binder resin is dispersed, for example, a colorant particle dispersion liquid in which colorant particles are dispersed and a release-agent particle dispersion liquid in which release-agent particles are dispersed are prepared.

The resin particle dispersion liquid is prepared by, for example, dispersing resin particles in a dispersion medium using a surfactant.

Examples of the dispersion medium used for preparing the resin particle dispersion liquid include aqueous media. Examples of the aqueous media include water, such as distilled water and ion-exchange water; and alcohols. These aqueous media may be used alone or in combination of two or more.

Examples of the surfactant include anionic surfactants, such as sulfate-based surfactants, sulfonate-based surfactants, and phosphate-based surfactants; cationic surfactants, such as amine-salt-based surfactants and quaternary-ammonium-salt-based surfactants; and nonionic surfactants, such as polyethylene-glycol surfactants, alkylphenol-ethylene-oxide-adduct-based surfactants, and polyhydric-alcohol-based surfactants. Among these surfactants, in particular, the anionic surfactants and the cationic surfactants may be used. The nonionic surfactants may be used in combination with the anionic surfactants and the cationic surfactants. These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the dispersion medium by, for example, phase-inversion emulsification. Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform phase inversion from W/O to O/W and disperse the resin in the aqueous medium in the form of particles.

The volume-average diameter of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume-average diameter of the resin particles is determined in the following manner. The particle diameter distribution of the resin particles is obtained using a laser-diffraction-type particle-size-distribution measurement apparatus (e.g., "LA-700" produced by HORIBA, Ltd.). The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume-average diameters of particles included in the other dispersion liquids are also determined in the above-described manner.

The content of the resin particles included in the resin particle dispersion liquid is preferably 5% by mass or more and 50% by mass or less and is more preferably 10% by mass or more and 40% by mass or less.

The colorant particle dispersion liquid, the release-agent particle dispersion liquid, and the like are also prepared as in the preparation of the resin particle dispersion liquid. In other words, the above-described specifications for the volume-average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release-agent particles dispersed in the release-agent particle dispersion liquid.

Aggregated Particle Formation Step

The resin particle dispersion liquid is mixed with the colorant particle dispersion liquid and the release-agent particle dispersion liquid.

In the resulting mixed dispersion liquid, heteroaggregation of the resin particles with the colorant particles and the release-agent particles is performed in order to form aggregated particles including the resin particles, the colorant particles, and the release-agent particles, the aggregated particles having a diameter close to that of the desired toner particles.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to a temperature close to the glass transition temperature of the resin particles (specifically, e.g., [Glass transition temperature of the resin particles—30° C.] or more and [Glass transition temperature—10° C.] or less), and thereby the particles dispersed in the mixed dispersion liquid are caused to aggregate together to form aggregated particles.

In the aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid. Using a metal complex as a flocculant reduces the amount of surfactant used and, as a result, charging characteristics may be enhanced.

An additive capable of forming a complex or a bond similar to a complex with the metal ions contained in the flocculant may optionally be used in combination with the flocculant. An example of the additive is a chelating agent.

Examples of the inorganic metal salts include metal salts, such as calcium chloride, calcium nitrate, barium chloride, magnesium chloride, zinc chloride, aluminium chloride, and aluminium sulfate; and inorganic metal salt polymers, such as polyaluminium chloride, polyaluminium hydroxide, and calcium polysulfide.

The chelating agent may be a water-soluble chelating agent. Examples of such a chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent used is preferably 0.01 parts by mass or more and 5.0 parts by mass or less and is more preferably 0.1 parts by mass or more and less than 3.0 parts by mass relative to 100 parts by mass of the resin particles.

Fusion-Coalescence Step

The aggregated particle dispersion liquid in which the aggregated particles are dispersed is heated to, for example, the glass transition temperature of the resin particles or more (e.g., temperature higher than the glass transition temperature of the resin particles by 10° C. to 30° C.) in order to perform fusion and coalescence of the aggregated particles. Hereby, toner particles are prepared.

The toner particles are prepared through the above-described steps.

It is also possible to prepare the toner particles by, after preparing the aggregated particle dispersion liquid in which the aggregated particles are dispersed, further mixing the aggregated particle dispersion liquid with a resin particle dispersion liquid in which resin particles are dispersed and subsequently performing aggregation such that the resin particles are deposited on the surfaces of the aggregated particles in order to form second aggregated particles; and by heating the resulting second-aggregated particle dispersion liquid in which the second aggregated particles are dispersed and thereby causing fusion and coalescence of the second aggregated particles to occur in order to form toner particles having a core-shell structure.

After the completion of the fusion-coalescence step, the toner particles formed in the solution are subjected to any suitable cleaning step, solid-liquid separation step, and drying step that are known in the related art in order to obtain dried toner particles. In the cleaning step, the toner particles may be subjected to displacement washing using ion-exchange water to a sufficient degree from the viewpoint of electrification characteristics. Examples of a solid-liquid separation method used in the solid-liquid separation step include suction filtration and pressure filtration from the viewpoint of productivity. Examples of a drying method used in the drying step include freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a Henschel mixer, a Lodige mixer, or the like. Optionally, coarse toner particles may be removed using a vibrating screen classifier, a wind screen classifier, or the like.

Electrostatic-Image Developer

The electrostatic-image developer according to an exemplary embodiment includes at least the toner according to the above-described exemplary embodiment.

The electrostatic-image developer according to the exemplary embodiment may be a monocomponent developer including only the above-described toner or may be a two-component developer that is a mixture of the above-described toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin. The coat resin and the matrix resin may optionally include additives, such as conductive particles. Examples of the conductive particles include particles of metals, such as gold, silver, and copper; and particles of carbon black, titanium oxide, zinc oxide, tin oxide, barium sulfate, aluminium borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner:carrier=1:100 to 30:100 and is more preferably 3:100 to 20:100.

Image Forming Apparatus and Image Forming Method

The image forming apparatus and the image forming method according to an exemplary embodiment are described below.

The image forming apparatus according to the exemplary embodiment includes an image holding member; a charging unit that charges the surface of the image holding member; an electrostatic-image formation unit that forms an electrostatic image on the surface of the image holding member charged; a developing unit that includes an electrostatic-image developer and develops the electrostatic image formed on the surface of the image holding member using the electrostatic-image developer to form a toner image; a transfer unit that transfers the toner image formed on the surface of the image holding member onto the surface of a recording medium; and a fixing unit that fixes the toner image onto the surface of the recording medium. The electrostatic-image developer according to the above-described exemplary embodiment is used as an electrostatic-image developer.

The image forming apparatus according to the exemplary embodiment uses an image forming method (image forming method according to the exemplary embodiment) including charging the surface of the image holding member; forming an electrostatic image on the surface of the charged image holding member; developing the electrostatic image formed on the surface of the image holding member using the electrostatic-image developer according to the above-described exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer-type image forming apparatus in which a toner image formed on the surface of the image holding member is directly transferred to a recording medium; an intermediate-transfer-type image forming apparatus in which a toner image formed on the surface of the image holding member is transferred onto the surface of the intermediate transfer body in the first transfer step and the toner image transferred on the surface of the intermediate transfer body is again transferred onto the surface of a recording medium in the second transfer step; an image forming apparatus including a cleaning unit that cleans the surface of the image holding member subsequent to transfer of the toner image before the image holding member is again charged; and an image forming apparatus including a static-eliminating unit that eliminates static by irradiating, after the toner image has been transferred, the surface of the image holding member to be again charged with static-eliminating light.

In the case where the image forming apparatus according to the exemplary embodiment is the intermediate-transfer-type image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including a developing unit and the electrostatic-image developer according to the above-described exemplary embodiment.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt (example of the intermediate transfer body) 20 runs above and extends over the units 10Y, 10M, 10C, and 10K. The intermediate transfer belt 20 is wound around a drive roller 22 and a support roller 24 and runs clockwise in FIG. 1, i.e., in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer body-cleaning device 30 is disposed so as to come into contact with the image holding member-side surface of the intermediate transfer belt 20 and to face the drive roller 22.

Developing devices (i.e., examples of the developing units) 4Y, 4M, 4C, and 4K of units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic-image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the cleaning unit) 6Y that removes a toner remaining on the surface of the photosensitive member 1Y after the first transfer.

The first transfer roller 5Y is disposed so as to be in contact with the inner surface of the intermediate transfer belt 20 and to face the photosensitive member 1Y. Each of the first transfer rollers 5Y, 5M, 5C, and 5K of the respective units is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is developed and visualized in the form of a toner image by the developing device 4Y at the developing position.

The developing device 4Y includes an electrostatic-image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the eliminated latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, in the first unit 10Y, for example, +10 μA by a controller (not illustrated).

The toner remaining on the photosensitive member 1Y is removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 being in contact with the inner surface of the intermediate transfer belt 20 and a second transfer roller (example of the second transfer subunit) 26 disposed on the image holding member-side of the intermediate transfer belt 20. A recording paper (example of the recording medium) P is fed by a feed mechanism into a narrow space between the second transfer roller 26 and the intermediate transfer belt 20 that are brought into contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

Subsequently, the recording paper P is transported into a nip part of the fixing device (example of the fixing unit) 28 at which a pair of fixing rollers are brought into contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge and Toner Cartridge

The process cartridge according to an exemplary embodiment is described below.

The process cartridge according to the exemplary embodiment includes a developing unit that includes the electrostatic-image developer according to the above-described exemplary embodiment and develops an electrostatic image formed on the surface of an image holding member using the electrostatic-image developer to form a toner image. The process cartridge according to the exemplary embodiment is detachably attachable to an image forming apparatus.

The structure of the process cartridge according to the exemplary embodiment is not limited to the above-described one. The process cartridge according to the exemplary embodiment may further include, in addition to the developing unit, at least one unit selected from an image holding member, a charging unit, an electrostatic-image formation unit, a transfer unit, and the like as needed.

An example of the process cartridge according to the exemplary embodiment is described below, but the process cartridge is not limited thereto. Hereinafter, only components illustrated in FIG. 2 are described; others are omitted.

Figure 2:
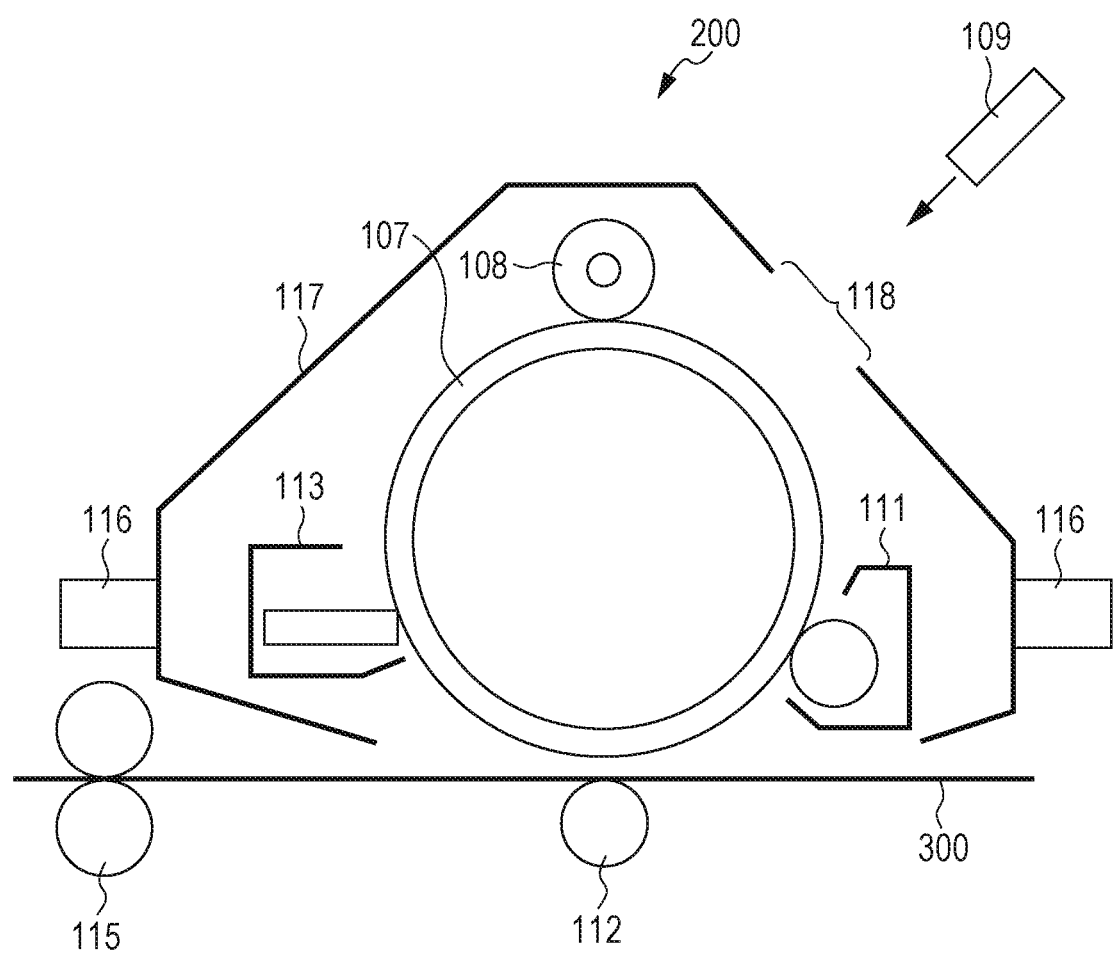
FIG. 2 is a schematic diagram illustrating an example of a process cartridge detachably attachable to an image forming apparatus according to an exemplary embodiment.

FIG. 2 schematically illustrates the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member-cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic-image formation unit), Reference numeral 112 denotes a transfer device (example of the transfer unit), Reference numeral 115 denotes a fixing device (example of the fixing unit), and the Reference numeral 300 denotes recording paper (example of the recording medium).

The toner cartridge according to an exemplary embodiment is described below.

The toner cartridge according to the exemplary embodiment includes the toner according to the above-described exemplary embodiment and is detachably attachable to an image forming apparatus. The toner cartridge includes a toner that is to be supplied to a developing unit disposed inside an image forming apparatus.

The image forming apparatus illustrated in FIG. 1 is an image forming apparatus that includes the toner cartridges 8Y, 8M, 8C, and 8K detachably attached to the image forming apparatus. Each of the developing devices 4Y, 4M, 4C, and 4K is connected to a specific one of the toner cartridges which corresponds to the developing device (color) with a toner feed pipe (not illustrated). When the amount of toner contained in a toner cartridge is small, the toner cartridge is replaced.

EXAMPLES

The exemplary embodiments of the present disclosure are described below in detail with reference to Examples below. The exemplary embodiments of the present disclosure are not limited to Examples below.

Synthesis of Hybrid Amorphous Resins
Synthesis of Hybrid Amorphous Resin (HB1)

Synthesis of Styrene Acrylate Resin Into a reaction container equipped with a cooling tube, 100 parts by mass of toluene is charged. Into the reaction container, 306 parts by mass of styrene, 94 parts by mass of n-butyl acrylate, 6 parts by mass of acrylic acid, and 0.2 parts by mass of β-carboxyethyl acrylate are charged. The above components are dissolved in the toluene. Subsequently, 0.75 parts by mass of azobisisobutyronitrile (AIBN) that serves as a radical polymerization initiator is added to the reaction container. The resulting mixture is stirred at 70° C. for 16 hours under a stream of nitrogen gas. The reaction product is precipitated in methanol. The precipitate is dried to form a styrene acrylate resin (SA1).

Synthesis of Amorphous Polyester Resin

Into a reaction container equipped with a stirrer, a thermometer, a condenser, and a nitrogen-gas-introduction pipe, 45 molar parts of bisphenol A-propylene oxide 2 mol adduct, 30 molar parts of ethylene glycol, 25 molar parts of neopentyl glycol, 90 molar parts of terephthalic acid, and 10 molar parts of dodecenylsuccinic anhydride are charged. Subsequently, the reaction container is purged with a dry nitrogen gas. Then, dibutyltin oxide that serves as a catalyst is charged into the reaction container in an amount of 1.0 parts by mass relative to 100 parts by mass of the total amount of the monomers used. Under a stream of nitrogen gas, the resulting mixture is stirred at 190° C. for 5 hours, then heated to 240° C., and stirred at 240° C. for 6 hours. Subsequently, the pressure inside the reaction container is reduced to 10.0 mmHg. The mixture is further stirred for 0.5 hours under the reduced pressure. Hereby, an amorphous polyester resin (PE1) is prepared.

Hybridization of Amorphous Polyester Resin and Styrene Acrylate Resin

In 70 parts by mass of toluene, 60 parts by mass of the amorphous polyester resin (PE1) and 40 parts by mass of the styrene acrylate resin (SA1) are dissolved. The resulting solution is charged into a reaction container equipped with a cooling tube. Subsequently, the solution is stirred at 120° C. for 5 hours under a stream of nitrogen gas in order to cause polymerization. Hereby, a hybrid amorphous resin (HB1) is prepared. The hybrid amorphous resin (HB1) has a weight-average molecular weight (Mw) of 36,000 and a glass transition temperature (Tg) of 55° C.

Synthesis of Hybrid Amorphous Resin (HB2)

A hybrid amorphous resin (HB2) is prepared as in the synthesis of the hybrid amorphous resin (HB1), except that, in the hybridization step described above, 40 parts by mass of the amorphous polyester resin (PE1) and 60 parts by mass of the styrene acrylate resin (SA1) are used. The hybrid amorphous resin (HB2) has a weight-average molecular weight (Mw) of 37,000 and a glass transition temperature (Tg) of 53° C.

Synthesis of Hybrid Amorphous Resin (HB3)

A hybrid amorphous resin (HB3) is prepared as in the synthesis of the hybrid amorphous resin (HB1), except that, in the hybridization step, 80 parts by mass of the amorphous polyester resin (PE1) and 20 parts by mass of the styrene acrylate resin (SA1) are used. The hybrid amorphous resin (HB3) has a weight-average molecular weight (Mw) of 38,000 and a glass transition temperature (Tg) of 57° C.

Preparation of Hybrid Amorphous Resin Particle Dispersion Liquids
Preparation of Hybrid Amorphous Resin Particle Dispersion Liquid (HB1)

Into the emulsification tank of a high-temperature, high-pressure emulsification apparatus "CAVITRON CD1010", 3,000 parts by mass of the hybrid amorphous resin (HB1), 10,000 parts by mass of ion-exchange water, and 90 parts by mass of sodium dodecylbenzenesulfonate are charged. The resulting mixture is heated to 130° C. in order to perform melting. Subsequently, while the mixture is heated at 110° C., the mixture is dispersed for 30 minutes at a flow rate of 3 L/min and a rotation speed of 10,000 rpm. The resulting dispersion liquid is passed through a cooling tank. Hereby, a hybrid amorphous resin particle dispersion liquid (HB1) is prepared. The hybrid amorphous resin particle dispersion liquid (HB1) has a solid content of 30% by mass. The volume-average size of the resin particles included in the hybrid amorphous resin particle dispersion liquid (HB1) is 115 nm.

Preparation of Hybrid Amorphous Resin Particle Dispersion Liquid (HB2)

A hybrid amorphous resin particle dispersion liquid (HB2) is prepared as in the preparation of the hybrid amorphous resin particle dispersion liquid (HB1), except that the hybrid amorphous resin (HB2) is used instead of the hybrid amorphous resin (HB1). The hybrid amorphous resin particle dispersion liquid (HB2) has a solid content of 30% by mass. The volume-average size of the resin particles included in the hybrid amorphous resin particle dispersion liquid (HB2) is 125 nm.

Preparation of Hybrid Amorphous Resin Particle Dispersion Liquid (HB3)

A hybrid amorphous resin particle dispersion liquid (HB3) is prepared as in the preparation of the hybrid amorphous resin particle dispersion liquid (HB1), except that the hybrid amorphous resin (HB3) is used instead of the hybrid amorphous resin (HB1). The hybrid amorphous resin particle dispersion liquid (HB3) has a solid content of 30% by mass. The volume-average size of the resin particles included in the hybrid amorphous resin particle dispersion liquid (HB3) is 120 nm.

Preparation of Amorphous Polyester Resin Particle Dispersion Liquid

The amorphous polyester resin (PE1) that is in a molten state is charged into the emulsification tank of a high-temperature, high-pressure emulsification apparatus "CAVITRON CD1010". A 0.37%-dilute ammonia water is also charged into the emulsification tank. While the resulting mixture is heated at 120° C., the mixture is dispersed for 30 minutes at a rotation speed 60 Hz and a pressure of 5 kg/cm$^2$. The resulting dispersion liquid is passed through a cooling tank. Hereby, an amorphous polyester resin particle dispersion liquid (PE1) is prepared. The amorphous polyester resin particle dispersion liquid (PE1) has a solid content of 30% by mass. The volume-average size of the resin particles included in the amorphous polyester resin particle dispersion liquid (PE1) is 130 nm.

Synthesis of Crystalline Polyester Resin

Into a reaction container equipped with a stirrer, a thermometer, a condenser, and a nitrogen-gas-introduction pipe, 1 molar part of 1,6-hexanediol and 1 molar part of dodecanedioic acid are charged. Subsequently, the reaction container is purged with a dry nitrogen gas. Then, titanium tetrabutoxide that serves as a catalyst is charged into the reaction container in an amount of 0.25 parts by mass relative to 100 parts by mass of the total amount of the monomers used. Under a stream of nitrogen gas, the resulting mixture is stirred at 170° C. for 3 hours and then heated to 210° C. over 1 hour. Subsequently, the pressure inside the reaction container is reduced to 3 kPa. The mixture is further stirred for 13 hours under the reduced pressure. Hereby, a crystalline polyester resin (Cr1) is prepared.

Preparation of Crystalline Polyester Resin Particle Dispersion Liquid

Into a jacketed reaction vessel equipped with a condenser, a thermometer, a water dropper, and an anchor paddle, 300 parts by mass of the crystalline polyester resin (Cr1), 160 parts by mass of methyl ethyl ketone, and 100 parts by mass of isopropyl alcohol are charged. While the temperature is maintained at 70° C. in a water-circulation thermostat, the resin is dissolved in the solvents while the resulting mixture is stirred at a rotation speed of 100 rpm. After the rotation speed has been changed to 150 rpm and the temperature of the water-circulation thermostat has been set to 66° C., 17 parts by mass of 10 mass %-ammonia water used as a reagent is charged into the reaction vessel over 10 minutes. Then, 900 parts by mass of ion-exchange water heated at 66° C. is added dropwise to the reaction vessel at a rate of 7 parts by mass per minute in order to perform phase inversion. Hereby, an emulsion is formed. Subsequently, 800 parts by mass of the emulsion and 700 parts by mass of ion-exchange water are charged into an eggplant flask, which is then placed in an evaporator equipped with a vacuum-control unit with a trap ball interposed therebetween. While the eggplant flask is rotated, it is heated in a hot-water bath maintained at 60° C. The pressure is reduced to 7 kPa to remove the solvents, with due attention paid to avoiding bumping. When the amount of solvent collected reaches 1,100 parts by mass, the pressure is increased to normal pressure and the eggplant flask is cooled with water. Hereby, a dispersion liquid is prepared. Ion-exchange water is added to the dispersion liquid such that the solid content in the dispersion liquid reaches 20% by mass. Hereby, a crystalline polyester resin particle dispersion liquid (Cr1) is prepared. The volume-average size of the resin particles included in the crystalline polyester resin particle dispersion liquid (Cr1) is 140 nm.

Preparation of Release-Agent Particle Dispersion Liquids
Preparation of Release-Agent Particle Dispersion Liquid (P)

A mixture of 50 parts by mass of a paraffin wax produced by NIPPON SEIRO CO., LTD. (melting temperature: 88° C.), 5 parts by mass of an anionic surfactant "NEOGEN RK" produced by DKS Co. Ltd., and 200 parts by mass of ion-exchange water is heated to 110° C. and subsequently dispersed with a homogenizer "ULTRA-TURRAX T50" produced by IKA. The resulting dispersion liquid is subjected to a further dispersion treatment using a Manton-Gaulin high-pressure homogenizer produced by Gaulin. Hereby, a release-agent particle dispersion liquid (P) is prepared. The release-agent particle dispersion liquid (P) has a solid content of 26% by mass. The volume-average size of the particles included in the release-agent particle dispersion liquid (P) is 150 nm.

Preparation of Release-Agent Particle Dispersion Liquid (E)

A release-agent particle dispersion liquid (E) is prepared as in the preparation of the release-agent particle dispersion liquid (P), except that an ester wax (melting temperature: 90° C.) is used instead of the paraffin wax. The release-agent particle dispersion liquid (E) has a solid content of 26% by mass. The volume-average size of the particles included in the release-agent particle dispersion liquid (E) is 160 nm.

Preparation of Yellow Colorant Particle Dispersion Liquids
Preparation of Colorant Particle Dispersion Liquid (NY)

A mixture of 70 parts by mass of C.I. Pigment Yellow 74 (commercial product), 1 part by mass of an anionic surfactant "NEOGEN RK" produced by DKS Co. Ltd., and 200 parts by mass of ion-exchange water is dispersed for 10 minutes with a homogenizer "ULTRA-TURRAX T50" produced by IKA. Ion-exchange water is added to the resulting dispersion liquid such that the solid content in the dispersion liquid reaches 20% by mass. Hereby, a colorant particle dispersion liquid (NY) is prepared. The volume-average size of the colorant particles included in the colorant particle dispersion liquid (NY) is 190 nm. Preparation of Colorant Particle Dispersion Liquids (Y1) to (Y6)

Colorant particle dispersion liquids (Y1), (Y2), (Y3), (Y4), (Y5), and (Y6) are prepared as in the preparation of the colorant particle dispersion liquid (NY), except that the C.I. Pigment Yellow 74 is washed with ion-exchange water before used for the preparation of the colorant particle dispersion liquid. In the preparation of the colorant particle dispersion liquids (Y1), (Y2), (Y3), (Y4), (Y5), and (Y6), the number of times the C.I. Pigment Yellow 74 is washed with ion-exchange water is changed one by one. The volume-average size of the colorant particles included in any of the colorant particle dispersion liquids (Y1), (Y2), (Y3), (Y4), (Y5), and (Y6) is 190 nm.

Preparation of Carrier

A mixture of 14 parts by mass of toluene, 2 parts by mass of a styrene-methyl methacrylate copolymer (polymerization mass ratio: 90:10, weight-average molecular weight: 80,000), and 0.2 parts by mass of carbon black "R330" produced by Cabot Corporation is stirred with a stirrer for 10 minutes to form a dispersion liquid. The dispersion liquid and 100 parts by mass of ferrite particles (volume-average size: 36 μm) are charged into a vacuum degassing kneader and then stirred at 60° C. for 30 minutes. While heating is performed, the pressure is reduced to perform degassing. Subsequently, drying is performed. Hereby, a carrier is prepared.

Example 1

Hybrid amorphous resin particle dispersion liquid (HB1): 100 parts by mass
Crystalline polyester resin particle dispersion liquid (Cr1): 15 parts by mass
Release-agent particle dispersion liquid (P): 15 parts by mass
Colorant particle dispersion liquid (Y1): 10 parts by mass
Aqueous anionic surfactant solution: 0.1 parts by mass
0.3 M aqueous nitric acid solution: 5 parts by mass
Ion-exchange water: 100 parts by mass The above materials are charged into a round stainless steel flask. An aqueous polyaluminum chloride (PAC) solution prepared by dissolving 2 parts by mass of a 30% PAC powder produced by Oji Paper Co., Ltd. in 20 parts by mass of ion-exchange water is added to the flask. The resulting mixture is dispersed with a homogenizer "ULTRA-TURRAX T50" produced by IKA. The resulting dispersion liquid is heated to 42° C. in an oil bath for heating and held for 30 minutes. After the formation of aggregated particles has been confirmed, 50 parts by mass of the hybrid amorphous resin particle dispersion liquid (HB1) is added to the dispersion liquid. Subsequently, holding is performed for another 30 minutes. Then, sodium nitrilotriacetate "CHELEST 70" produced by Chubu Chelest Co., Ltd. is added to the dispersion liquid in an amount that is 3% by mass of the amount of the dispersion liquid. Subsequently, a 1 N aqueous sodium hydroxide solution is slowly added to the dispersion liquid until the pH of the dispersion liquid reaches 7.2. While stirring is continued, the dispersion liquid is heated to 85° C. and held for 3 hours. The reaction product is filtered, and the filtrate is washed with ion-exchange water. Then, drying is performed with a vacuum dryer. Hereby, toner particles (1) are prepared.

To 100 parts by mass of the toner particles (1), 3 parts by mass of first silica particles that are silica particles produced by a sol-gel method (the content of hexamethyldisilazane used for surface treatment: 5 mass %, average primary particle size: 120 nm) and 1 part by mass of second silica particles "R972" produced by Nippon Aerosil Co., Ltd. are added. The resulting mixture is stirred with a Henschel mixer at a peripheral speed of 30 m/s for 15 minutes. Subsequently, coarse particles are removed using a sieve having an opening of 45 μm. Hereby, a toner (1) is prepared.

The toner (1) and the carrier are charged into a V-blender at proportions of Toner (1):Carrier=10:90 (by mass), and the resulting mixture is stirred for 20 minutes to form a developer (1).

Examples 2 to 6

Toner particles (2) to (6), toners (2) to (6), and developers (2) to (6) are prepared as in Example 1, except that a specific one of the colorant particle dispersion liquids (Y2), (Y3), (Y4), (Y5), and (Y6) is used instead of the colorant particle dispersion liquid (Y1).

Example 7

Toner particles (7), a toner (7), and a developer (7) are prepared as in Example 1, except that the hybrid amorphous resin particle dispersion liquid (HB2) is used instead of the hybrid amorphous resin particle dispersion liquid (HB1), and the colorant particle dispersion liquid (Y3) is used instead of the colorant particle dispersion liquid (Y1).

Example 8

Toner particles (8), a toner (8), and a developer (8) are prepared as in Example 1, except that the hybrid amorphous resin particle dispersion liquid (HB3) is used instead of the hybrid amorphous resin particle dispersion liquid (HB1), and the colorant particle dispersion liquid (Y3) is used instead of the colorant particle dispersion liquid (Y1).

Example 9

Toner particles (9), a toner (9), and a developer (9) are prepared as in Example 1, except that the release-agent particle dispersion liquid (E) is used instead of the release-agent particle dispersion liquid (P), and the colorant particle dispersion liquid (Y3) is used instead of the colorant particle dispersion liquid (Y1).

Example 10

Toner particles (10), a toner (10), and a developer (10) are prepared as in Example 1, except that the crystalline polyester resin particle dispersion liquid (Cr1) is not used, the amount of the hybrid amorphous resin particle dispersion liquid (HB1) used is increased by an amount equal to the amount of the crystalline polyester resin particle dispersion liquid (Cr1) used in Example 1, and the colorant particle dispersion liquid (Y3) is used instead of the colorant particle dispersion liquid (Y1).

Comparative Example 1

Toner particles (C1), a toner (C1), and a developer (C1) are prepared as in Example 1, except that the colorant particle dispersion liquid (NY) is used instead of the colorant particle dispersion liquid (Y1).

Reference Example 1

Toner particles (C2), a toner (C2), and a developer (C2) are prepared as in Comparative example 1, except that the amorphous polyester resin particle dispersion liquid (PE1) is used instead of the hybrid amorphous resin particle dispersion liquid (HB1).

Performance Evaluations

Each of the developers prepared in Examples above is charged into a yellow developing device of an image forming apparatus "DocuCentre color 400" produced by Fuji Xerox Co., Ltd. Commercial cyan, yellow, and black developers are charged into the cyan, magenta, and black developing devices of the image forming apparatus.

Test Chart No. 5-1 produced by The Imaging Society of Japan is formed on a recording medium that is a YUPO digital print paper sheet (thickness: 150 μm).

At 42° C., the surface of the paper sheet on which the image is formed is irradiated with ultraviolet radiation at 550 mW/cm$^2$ for 6 hours.

Subsequent to the ultraviolet irradiation, the yellow gradation patches formed on the surface of the paper sheet on which the image is formed are scratched with a scratch hardness tester 318 produced by ERICHSEN at a speed of 5 to 10 mm/sec such that a straight line having a length of 5 to 10 mm is drawn. The maximum compressive force (N) at which removal of the image is not confirmed by the naked eye is considered as scratch hardness. It is considered that a scratch hardness of 2.5 N or more is acceptable.

TABLE 1

| | Toner particles, toner, developer No. | D50v of toner particles μm | Amorphous resin | | Crystalline resin Type | Release agent Type | Colorant particle dispersion liquid Type | Content of 1-amino-2-methoxybenzene ppm | Scratch hardness N |
|---|---|---|---|---|---|---|---|---|---|
| | | | Type | Mass ratio between segments | | | | | |
| Reference example 1 | (C2) | 5.8 | PE1 | — | Cr1 | Paraffin | (NY) | 210 | 1 |
| Comparative example 1 | (C1) | 5.7 | HB1 | PES:StAc = 60:40 | Cr1 | Paraffin | (NY) | 210 | 2 |
| Example 1 | (1) | 5.9 | HB1 | PES:StAc = 60:40 | Cr1 | Paraffin | (Y1) | 190 | 3 |
| Example 2 | (2) | 5.7 | HB1 | PES:StAc = 60:40 | Cr1 | Paraffin | (Y2) | 120 | 4 |
| Example 3 | (3) | 5.8 | HB1 | PES:StAc = 60:40 | Cr1 | Paraffin | (Y3) | 60 | 5 |
| Example 4 | (4) | 5.8 | HB1 | PES:StAc = 60:40 | Cr1 | Paraffin | (Y4) | 10 | 7 |
| Example 5 | (5) | 5.9 | HB1 | PES:StAc = 60:40 | Cr1 | Paraffin | (Y5) | 4 | 9 |
| Example 6 | (6) | 6.0 | HB1 | PES:StAc = 60:40 | Cr1 | Paraffin | (Y6) | Beyond detection | 10 |
| Example 7 | (7) | 5.4 | HB2 | PES:StAc = 40:60 | Cr1 | Paraffin | (Y3) | 60 | 5.5 |
| Example 8 | (8) | 5.8 | HB3 | PES:StAc = 80:20 | Cr1 | Paraffin | (Y3) | 60 | 4.5 |
| Example 9 | (9) | 6.0 | HB1 | PES:StAc = 60:40 | Cr1 | Ester | (Y3) | 60 | 5 |
| Example 10 | (10) | 5.7 | HB1 | PES:StAc = 60:40 | — | Paraffin | (Y3) | 60 | 3.5 |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic-image developing toner comprising:
    toner particles including
        a binder resin including an amorphous resin, the amorphous resin including a polyester resin segment and a styrene acrylate resin segment, and
        a release agent; and
    1-amino-2-methoxybenzene,
    wherein a content of the 1-amino-2-methoxybenzene in the electrostatic-image developing toner is 200 ppm by mass or less.

2. The electrostatic-image developing toner according to claim 1,
    wherein the binder resin further includes a crystalline resin.

3. The electrostatic-image developing toner according to claim 1,
    wherein, in the amorphous resin, a ratio of the amount of the styrene acrylate resin segment to a total amount of the polyester resin segment and the styrene acrylate resin segment is 20% by mass or more and 60% by mass or less.

4. The electrostatic-image developing toner according to claim 1,
    wherein the toner particles include, as a colorant, C.I. Pigment Yellow 74.

5. The electrostatic-image developing toner according to claim 1,
    wherein the release agent includes at least one selected from a paraffin wax and an ester wax.

6. The electrostatic-image developing toner according to claim 1,
    wherein the polyester resin segment includes neopentyl glycol that is a monomer component constituting the polyester resin segment.

7. The electrostatic-image developing toner according to claim 1,
    wherein a ratio of a total amount of bisphenol A-ethylene oxide adduct and bisphenol A-propylene oxide adduct to a total amount of alcohol components constituting the polyester resin segment is 10 mol % or more and 90 mol % or less.

8. The electrostatic-image developing toner according to claim 1,
    wherein a ratio of a total amount of styrene to a total amount of monomers constituting the styrene acrylate resin segment is 50% by mass or more and 90% by mass or less.

9. The electrostatic-image developing toner according to claim 1,
    wherein the toner particles are core-shell particles.

10. An electrostatic-image developer comprising the electrostatic-image developing toner according to claim 1.

11. A toner cartridge detachably attachable to an image forming apparatus, the toner cartridge comprising the electrostatic-image developing toner according to claim 1.

* * * * *